US006390724B1

(12) United States Patent
Thoms et al.

(10) Patent No.: US 6,390,724 B1
(45) Date of Patent: May 21, 2002

(54) CONNECTING ELEMENT

(75) Inventors: Volker Thoms, Calw; Willi Wurl, Wüstenrot, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/673,972

(22) PCT Filed: Apr. 14, 1999

(86) PCT No.: PCT/EP99/02494

§ 371 Date: Dec. 1, 2000

§ 102(e) Date: Dec. 1, 2000

(87) PCT Pub. No.: WO99/56056

PCT Pub. Date: Nov. 4, 1999

(30) Foreign Application Priority Data

Apr. 25, 1998 (DE) .......................................... 198 18 597

(51) Int. Cl.⁷ ................................................ F16B 12/46
(52) U.S. Cl. ...................................... 403/402; 403/403
(58) Field of Search ................................ 403/401, 402, 403/403, 382

(56) References Cited

U.S. PATENT DOCUMENTS

| 4,032,242 A | * | 6/1977 | Morris | 403/403 X |
| 5,116,161 A | * | 5/1992 | Faisst | 403/403 X |
| 6,279,879 B1 | * | 8/2001 | Statz | 403/403 X |

FOREIGN PATENT DOCUMENTS

| DE | 32 48 072 A1 | 1/1984 |
| DE | 34 23 967 A1 | 1/1986 |
| DE | 40 12 206 A1 | 10/1991 |
| GB | 193090 | 2/1923 |

* cited by examiner

Primary Examiner—Lynne H. Browne
Assistant Examiner—John R. Cottingham
(74) Attorney, Agent, or Firm—Crowell & Moring, LLP

(57) ABSTRACT

A connecting element for connecting two adjacent profiled rods, whose longitudinal axes enclose an angle α, is to be further developed such that its production is simplified with respect to different angles α. This is achieved in that, on the exterior sides of two sides of the connecting element enclosing the angle α, retaining edges are arranged which project laterally transversely to the plane containing the angle α, which are each connected by a deformable profiled retaining web and which interact such with corresponding receiving devices on the exterior sides of the profiled rods facing the connecting element that, when the retaining webs are undeformed, the connecting element can be joined by its retaining edges between the receiving devices to the profiled rods, and by the deforming of the retaining webs, their profile is stretched transversely to the plane containing the angle α, laterally toward the outside, and the retaining edges, which move away from one another in the process, reach laterally behind undercuts of the receiving devices.

14 Claims, 3 Drawing Sheets

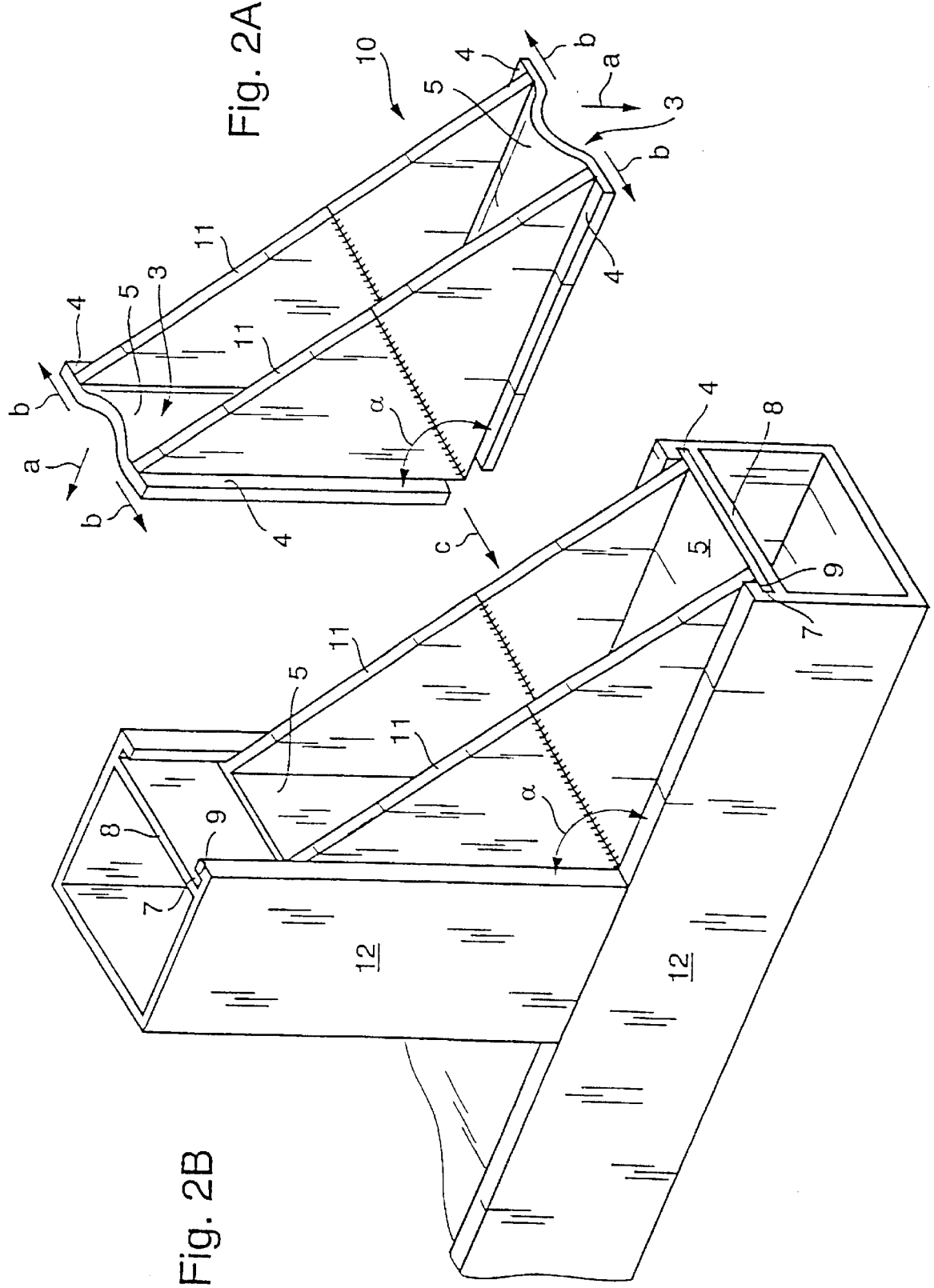

CONNECTING ELEMENT

The invention relates to a connecting element for connecting two adjacent oblong profiled parts whose longitudinal axes enclose an angle α. In addition, the invention relates to a method for producing such a connecting element.

From German Patent Document DE 40 12 206 C2, a composite element is known which is composed of at least one plate-shaped element and at least one oblong profiled part which is formed by an extruded section, at least one profiled deformable retaining web being constructed on each plate-shaped element, which retaining web interacts in each case with a groove-shaped receiving device of the profiled part which corresponds with the retaining web. The connection of the plate-shaped element having the retaining web with the oblong profiled part having the groove-shaped receiving device to form the known composite element takes place in that, by deforming the retaining web which, as received, is profiled in a roof-shape or in a V-shape and, in the deformed condition, has an elongated straight shape, a form-locking joined connection is formed between the plate-shaped element and the profiled part, in which edge sections of the retaining web laterally reach behind undercuts of the receiving device. Such a form-locking joined connection can be implemented relatively easily, for example, by means of a corresponding stamping tool. A composite element produced in this manner has very high stability values. This type of connection technique has been successful in practice.

From German Patent Document DE 27 51 753 A1, an automobile body construction is known in which perpendicularly abutting profiled rods hare fastened to one another by means of a corner connection piece. On two exterior sides, which stand perpendicularly upon one another, the corner connection piece has in each case at least one shim which can be fastened on the corner connection piece by way of a screw. For connecting the profiled rods, the corner connection piece is inserted into a corner which forms between the profiled rods which mutually abut at a right angle, in which case the shims of the corner connection piece can enter into corresponding longitudinal grooves extending in the longitudinal direction of the profiled rods. As long as the fastening screws of the shims have not been tightened, the shims will be swivellable and can therefore be adjusted into a position in which they laterally reach behind undercuts provided in the longitudinal grooves. In these positions, the fastening screws of the shims will be tightened, whereby the corner connection piece is fastened on the two profiled rods and therefore connects the profiled rods with one another. The corner connection piece is conceived as a casting, has a plurality of individual components, such as screws and shims, and its manufacturing therefore requires relatively high expenditures. In addition, for a different angle between the profiled rods to be connected with one another, a fitting corner connection piece and the casting mold required for this purpose must be completely newly developed, whereby only the use of standard angles (for example, 90°) makes sense from an economic point of view.

U.S. Pat. No. 3,622,186 shows and describes a connecting element for connecting two adjacent oblong profiled parts whose longitudinal axes enclose an angle. On the interior sides of two sides of the connecting element enclosing this angle, laterally projecting retaining edges are arranged transversely to the plane containing the angle, which retaining edges are each connected by a deformable profiled retaining web. These retaining edges interact with corresponding receiving devices which are formed on the exterior sides of the profiled parts facing the connecting element. When the retaining webs are undeformed, the known connecting element can be joined by means of its retaining edges between the receiving device to the exterior sides of the profiled parts. By the deforming of the retaining webs, the profile of the retaining webs is stretched laterally to the outside transversely to the plane containing the above-mentioned angle, in which case the retaining edges move away from one another and reach laterally behind undercuts of the receiving devices.

The present invention relates to the problem of providing a connecting element by means of which a connection can be achieved of two adjoining profiled parts enclosing an angle, which connection has a high angular stability and therefore a high stiffness.

According to the invention, this problem is solved by means of a connecting element having the characteristics of claim 1 because, as the result of the two walls extending parallel to one another, the connecting element itself has a high angular stability and stiffness, so that the connection between two profiled parts established by means of this connecting element also receives a high angular stability and stiffness.

For manufacturing the connecting element, only one profile needs to be used which, in particular, can be produced by extruding and which permits the use of the initially described connection technique forming a form-locking joined connection, in which case, for example, two parts of this profile which are mitered, are appropriately fastened to one another. Although, as a result of the required connection of two individual, correspondingly cut individual profiled parts, in comparison to a production by means of a casting mold, an additional manufacturing step is required, in the case of the connecting element according to the invention, there is the advantage that it can be produced with an arbitrary angle α without requiring additional costs. In addition, the use of the initially described connecting technique eliminates additional fastening elements, such as shims and screws.

Corresponding to a particularly expedient embodiment of the connecting element according to the invention, the profile of the retaining webs may have a groove-shaped construction, the open side of this groove being oriented toward the outside. In this case, the groove may preferably be constructed in a V-shaped or rounded manner. The suggested embodiments permit a particularly effective linking or fastening of the connecting element to the profile parts and therefore ensure a particularly high stability of the connection between the profiled parts established in this manner.

The problem on which the invention is based is also solved by means of a method having the characteristics of claim 8.

The method according to the invention is based on the general idea of using an extruded profile for producing the connecting element according to the invention, which extruded profile twice contains in a reflected form the profile of the exterior sides by means of which the linking to the profiled parts is implemented. As a result, the connecting element according to the invention with the desired angle α with two components separated by suitable cuts from the extruded profile can be produced in a particularly waste-free manner. In this case, any arbitrary angle α can be achieved in principle, in that a miter cut is carried out whose sectional plane encloses an angle β with the plane of symmetry or the reflection plane of the profiles to be assigned to the exterior side, which angle β is half as large as the desired angle α between the exterior sides of the connecting element. By means of a subsequent rotating of the components separated by the miter cut about an axis perpendicular to the sectional plane of the miter cut by 180°, the components of the connecting element are provided with a relative position in which the exterior sides of the connecting element formed in this manner enclose the angle α.

Corresponding to a further development of the method according to the invention, the components of the connecting element, which adjoin one another offset by 180° relative to one another, can be fastened to one another by the welding-together of the walls along the miter cut, whereby a sufficiently stable connection of the components with the connecting element is obtained in a particularly simple manner.

Corresponding to an expedient embodiment of the method according to the invention, before or after the fastening of the mutually adjoined parts of the connecting element, one portion of the walls respectively can be separated by means of a cut which extends in a plane cutting the miter cuts. This measure result in a considerable reduction of weight without impairing the stiffness of the connecting element in a significant manner.

An alternative, the connecting element according to the invention can also be produced by means of a method having the characteristics of claim 11. The connecting element can then be produced by a thixocasting process or a thixoforming process, whereby the connecting element receives a ductility which is particularly advantageous for forming the connection with the profiled parts.

Additional important characteristics and advantages of the invention are contained in the subclaims, the drawings and in the following description of preferred embodiments by means of the drawings.

FIG. 2 are schematic diagrams A, B for illustrating a fastening of two adjoining profiled parts with the connecting element according to the invention;

Figure 1A:
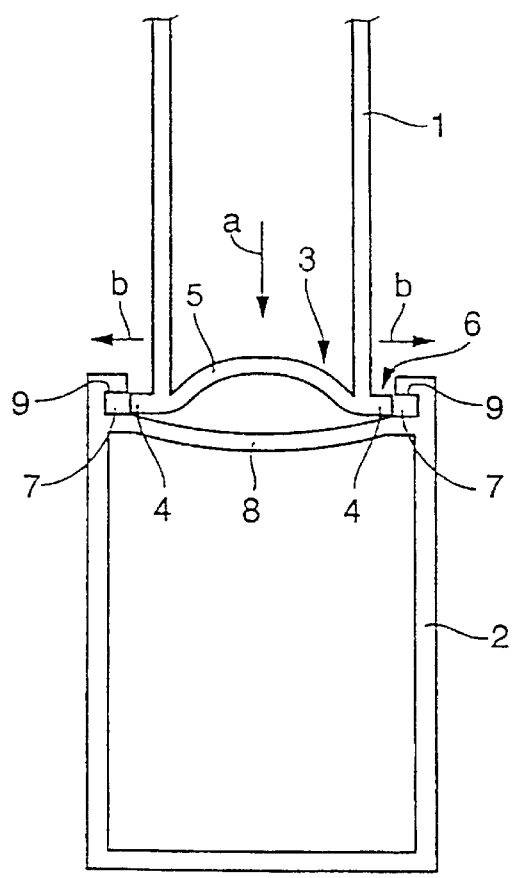
FIG. 1 are schematic diagrams A and B for illustrating the connecting technique used in the case of the connecting element according to the invention.

Corresponding to FIG. 1, a first component 1, which is to be fastened to a second component 2, has retaining edges 4 on its exterior side 3 facing the second component 2, which retaining edges 4 project laterally beyond the contour of the first component 1. On their mutually facing interior sides, the mutually opposite retaining edges 4 are connected with one another by way of a retaining web 5.

Figure 1B:
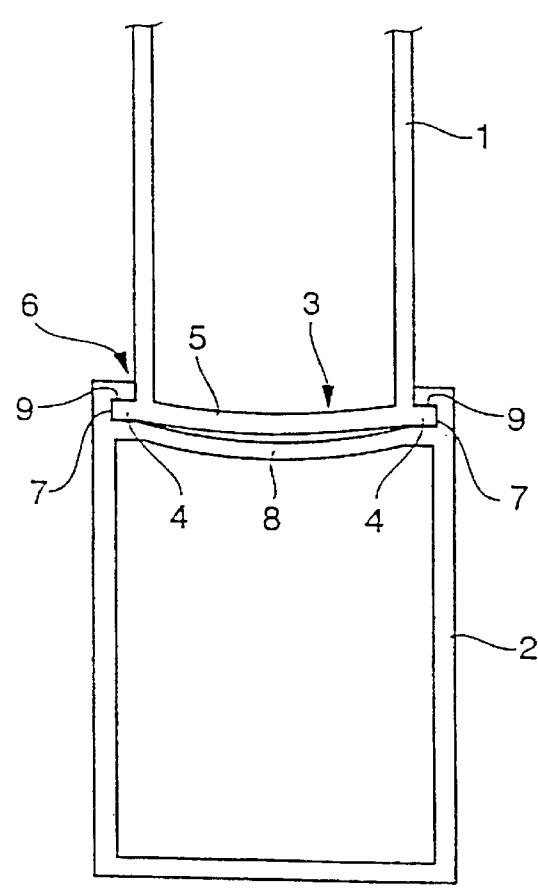

In the undeformed starting position corresponding to FIG. 1A, the retaining web 5 has a curved shape and forms a groove which is open with respect to the second component 2. In order to establish the connection between the components 1 and 2, the first component 1, advancing with its exterior side 3, is introduced into a recess 6 of the second component 2, in which case the retaining edges 4 are positioned between two receiving devices 7 laterally bounding the recess 6, when the exterior side 3 of the first component 1 comes to rest on the side 8 of he second component 2 in the recess 6, which side 8 faces the exterior side 3 of the first component 1. If subsequently the retaining web 5 is deformed, for example, by means of a pressure stamp acting in the direction of the arrow a, the retaining web 5 will stretch and the retaining edges 4 connected therewith are displaced laterally to the outside while moving away from one another corresponding to the arrows b, in which case they enter into the receiving devices 7 and reach behind lateral undercuts 9 of the receiving devices 7, which is illustrated in FIG. 1B. The form-locking linking of the first component 1 to the second component 2 achieved by means of this connecting technique has a high stability. By means of a corresponding coordination of the dimensioning of the retaining web 5 as well as a corresponding coordination of the retaining edges 4 with the receiving devices 7, a frictional connection can additionally be achieved between the components 1 and 2, so that neither movements in the direction of the drawing plane of FIGS. 1A and 1B, nor perpendicularly thereto can be carried out.

FIG. 2A shows a connecting element 10 according to the invention which has two exterior sides 3 provided with retaining edges 4 which exterior sides 3 are still in the undeformed starting condition (compare FIG. 1A). The retaining web 5 connecting the retaining edges 4 of an exterior side 3 are correspondingly curved in a groove-shaped manner. The exterior sides 3 enclose an angle α (in the embodiment approximately 90°) and are connected on their back sides by two mutually parallel extending walls 11. In this case, the walls 11 are fastened along a transition area between a retaining edge 4 and the retaining web 5 or are produced in one piece with the corresponding exterior side 3 of the connecting element 10.

According to FIG. 2B, two adjacent or mutually adjoining profiled parts 12 constructed as profiled rods are fastened to one another—while forming the angle α between their longitudinal axes—, in that the undeformed connecting element 10 corresponding to FIG. 2A is entered into the corner enclosing the angle α and formed between the profiled rods 12, which is indicated by the arrow c. After the inserting of the connecting element 10, its exterior sides 3 or their retaining webs 5 are deformed corresponding to the connecting method described in FIGS. 1A and 1B, in which case the retaining edges 4 of the connecting element 10 again enter into the corresponding receiving devices 7 provided in the sides 8 of the profiled rods 12 facing the connecting element 10 and reach behind corresponding undercuts 9.

Figure 3:
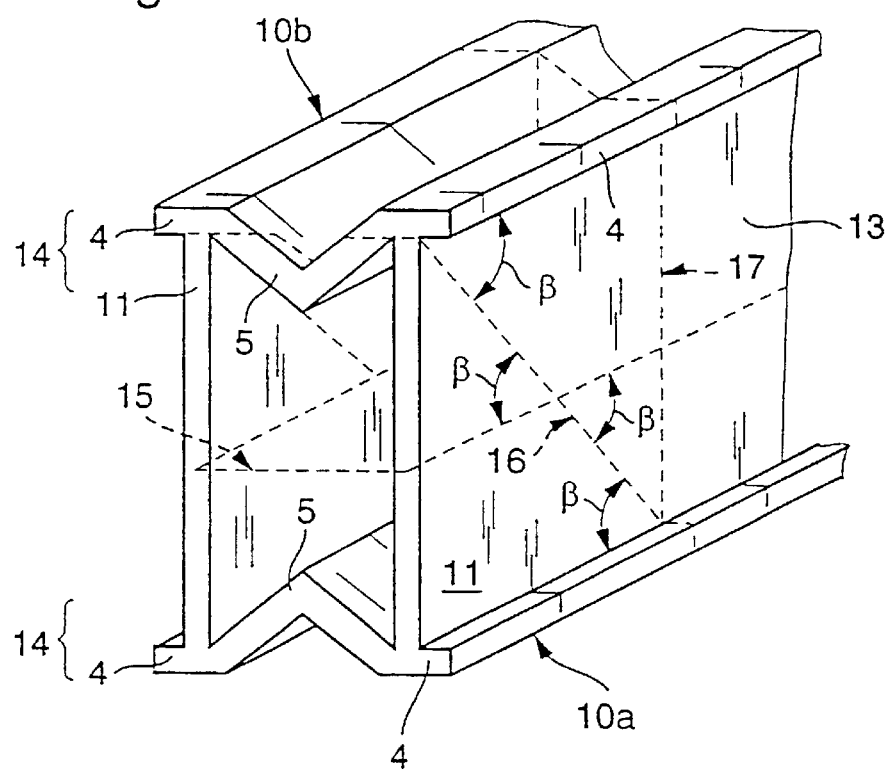
FIG. 3 is perspective view of an extruded profile which is used as the starting material for producing the connecting element according to the invention.
Figure 4:
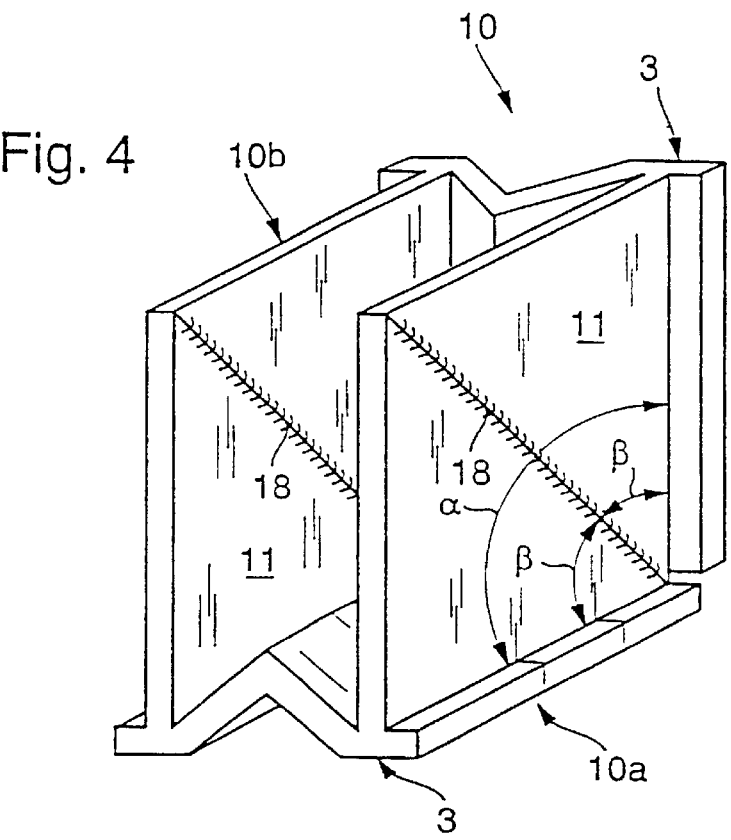
FIG. 4 is a perspective top view of a connecting element produced corresponding to the method of the invention.

While, in FIGS. 1 and 2, the retaining web 5 connecting the retaining edges 4 is constructed in the form of a curved groove, in the embodiments according to FIGS. 3 and 4, this retaining web 5 has a V-shaped or roof-shaped profile. For the manufacturing of the connecting element 10 according to the invention, an extruded profile 13 is used corresponding to FIG. 3, which twice contains a profiled area 14 formed of the retaining edges 4 and the retaining web 5 connecting these retaining edges 4. This profiled area 14 is characterized in FIG. 3 by curly brackets and corresponds to the profile of an exterior side 3 of the connecting element 10. The profiled areas 14 are arranged in the extruded profile 13 in a mirror-inverted manner with respect to a plane of symmetry 15 and are connected with one another by the mutually parallel extending walls 11.

For producing the connecting element 10, a first part 10a is first separated from the extruded profile 13 by a miter cut. The miter cut extends in a sectional plane 16 which, on the one hand, intersects with the plane of symmetry 15 in a straight line and extends transversely to the longitudinal direction of the extruded profile 13 and, on the other hand, encloses an angle β with the plane of symmetry 15, which angle β is half the size of the angle α enclosed between the profiled rods 12 to be connected with one another.

Subsequently, a second part 10b is separated from the extruded profile 13 by means of a cut extending in a plane 17 extending perpendicularly to the longitudinal direction of the extruded profile 13.

For forming the connecting element 10 according to the invention from the components 10a and 10b, corresponding to FIG. 4, the second part 10b is rotated by 180° about an axis of rotation extending perpendicularly to the miter cut plane 16, so that the cut edges formed by the miter cut on the walls 11 alternately come to rest against one another. The mutually adjoining cut edges of the individual parts 10a and 10b are connected with one another corresponding to FIG. 4, for example, by means of a welding seam 18. Because of the geometrical relationships, the angle $\beta$ in each case also exists between the miter cut or seam 18 and the exterior sides 3 formed in FIG. 4 by the profiled areas 14, so that the angle $\beta+\beta=\alpha$ exists which is enclosed between the exterior sides 3 of the connecting element 10.

In order to bring the connecting element 10 of FIG. 4 produced according to the method suggested in the invention into the form of the connecting element 10 illustrated in FIG. 2A, portions of the walls 11 facing away from the enclosed angle $\alpha$ can be separated, for example, by means of a cut which extends in a plane which is situated perpendicularly on the miter cuts or on the weld seams 18 and extends through the ends of the exterior sides 3 facing away from the enclosed angle $\alpha$.

The connecting element 10 according to the invention can be used, for example, for the construction of a self-supporting lattice frame as a supporting structure in an omnibus.

What is claimed is:

1. A combination of a connecting element and two oblong profiled parts, the profiled parts being arranged adjacent to one another for connection such that longitudinal axes of the profiled parts enclose an angle ($\alpha$), wherein retaining edges are arranged on two exterior sides of the connecting element enclosing the angle ($\alpha$) so as to project laterally transversely to a plane containing the angle ($\alpha$) and are in each case connected by a deformable profiled retaining web, wherein said retaining edges interact with corresponding receiving devices on the exterior sides of the profiled parts facing the connecting element such that, when the retaining webs are undeformed, the connecting element can be joined, by its retaining edges between the receiving devices, to the exterior sides of the profiled parts, wherein by deforming the retaining webs, their profile is stretched transversely to the plane containing the angle ($\alpha$), laterally toward the outside, and the retaining edges, which move away from one another in this process, reach laterally behind undercuts of the receiving devices, wherein the exterior sides of the connecting element, which enclose the angle ($\alpha$), are connected with one another on their back side by two parallel extending walls, each of said two parallel extending walls being arranged along a transition area between at least one of the retaining webs and at least one of the retaining edges.

2. The combination according to claim 1, wherein the profile of the retaining webs has a groove-shaped construction with an open side thereof being oriented toward the outside.

3. The combination according to claim 2, wherein the groove has a V-shaped or rounded construction.

4. The combination according to claim 1, wherein the connecting element includes at least two components which are fastened to one another by welding.

5. The combination according to claim 4, wherein each of the fastened components has two of said retaining edges connected by one of the retaining webs.

6. The combination according to claim 1, wherein the connecting element is produced in one piece as a casting.

7. The combination according to claim 6, wherein the connecting element is produced by one of a vacuum diecasting process, a thixocasting process and a thixoforming process.

8. A process for producing the connecting element of the combination according to claim 1, comprising:

producing a profile by extruding which twice contains a profiled area formed of the retaining edges and one of the retaining webs connecting the retaining edges, the profiled areas situated opposite one another in a mirror-inverted manner with respect to a plane of symmetry extending in the longitudinal direction of the profile and connected with one another by parallel walls, separating a first portion from the extruded profile by a miter cut, a sectional plane and the plane of symmetry intersecting in a straight line which extends perpendicularly to the longitudinal direction of the extruded profile, an angle ($\beta$) at which the sectional plane intersects with the plane of symmetry being half as large as the angle ($\alpha$) which is enclosed by the longitudinal axes of the profiled parts which are to be connected with one another, separating a second portion containing the miter cut from the extruded profile perpendicularly to its longitudinal direction, and adjoining the first and second portions to one another on their miter cuts offset relative to one another by 180° and fastening the portions to one another.

9. The process according to claim 8, wherein adjoining the first and second portions to one another includes fastening the first and second portions to one another by welding together the walls along the miter cut.

10. The process according to claim 8 and further comprising separating a portion of each of the walls by a cut extending in a plane intersecting the miter cuts before or after the fastening of the first and second portions of the connecting element.

11. A process for producing the connecting element of the combination according to claim 6, wherein the process is a casting process.

12. The process according to claim 11, wherein the casting process is one of a vacuum diecasting process, a thixocasting process, and a thixoforming process.

13. A process for producing the connecting element of the combination according to claim 7, wherein the process is a casting process.

14. The process according to claim 13, wherein the casting process is one of a vacuum diecasting process, a thixocasting process, and a thixoforming process.

* * * * *